(12) United States Patent
Kawakita et al.

(10) Patent No.: US 9,969,028 B2
(45) Date of Patent: May 15, 2018

(54) WELDED PORTION INSPECTION METHOD

(71) Applicant: TOYOTA JIDOSHA KABUSHIKI KAISHA, Toyota-shi, Aichi (JP)

(72) Inventors: Atsushi Kawakita, Miyoshi (JP); Shuhei Ogura, Nagakute (JP); Hiroaki Kishi, Nagoya (JP); Yuta Iwamoto, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 463 days.

(21) Appl. No.: 14/616,869

(22) Filed: Feb. 9, 2015

(65) Prior Publication Data
US 2015/0246413 A1 Sep. 3, 2015

(30) Foreign Application Priority Data

Feb. 28, 2014 (JP) .................................. 2014-039675

(51) Int. Cl.
*B23K 26/03* (2006.01)
*B23K 26/24* (2014.01)
(Continued)

(52) U.S. Cl.
CPC .......... *B23K 26/032* (2013.01); *B23K 26/082* (2015.10); *B23K 26/22* (2013.01); *B23K 31/125* (2013.01); *G01J 1/42* (2013.01)

(58) Field of Classification Search
CPC .... B23K 31/125; B23K 26/082; B23K 26/22; B23K 26/032; G01J 1/42
(Continued)

(56) References Cited

U.S. PATENT DOCUMENTS

| 6,791,057 B1 * | 9/2004 | Kratzsch | B23K 26/032 219/121.62 |
| 2004/0114662 A1 * | 6/2004 | Messler | B23K 26/032 374/130 |
| 2013/0193122 A1 | 8/2013 | Nomaru et al. | |

FOREIGN PATENT DOCUMENTS

| JP | 8-267241 A | 10/1996 |
| JP | 2005-131645 A | 5/2005 |

(Continued)

OTHER PUBLICATIONS

Kubo M et al.; laser processing state judgment method; May 26, 2005; JPO; 12 pages.*

*Primary Examiner* — Dana Ross
*Assistant Examiner* — Kuangyue Chen
(74) *Attorney, Agent, or Firm* — Sughrue Mion, PLLC

(57) ABSTRACT

A welded portion inspection method accurately identifies emitted light from a molten portion during inspection laser light irradiation, enabling reliable inspection. When transitioning from welding laser light irradiation to inspection laser light irradiation, the welding laser light irradiation is interrupted and then the welding laser light is switched to the inspection laser light. In inspecting a welded portion, two points in time at which the emitted light intensity is equal to or less than a certain threshold value are extracted from an intensity waveform of the emitted light as an inspection start point in time and an inspection end point in time. The interval between the inspection start and end points is estimated as being a irradiation period of the inspection laser light. The welded state is inspected based on the intensity waveform of the emitted light in the irradiation period.

2 Claims, 9 Drawing Sheets

(51) Int. Cl.
  *B23K 31/12*     (2006.01)
  *G01J 1/42*      (2006.01)
  *B23K 26/22*     (2006.01)
  *B23K 26/082*    (2014.01)

(58) Field of Classification Search
  USPC ............ 219/121.62–121.64, 121.67, 121.83;
                                    356/239.1, 429–431
  See application file for complete search history.

(56)                   References Cited

FOREIGN PATENT DOCUMENTS

| | | | |
|---|---|---|---|
| JP | 2005131645 A | * | 5/2005 |
| JP | 2008-87056 A | | 4/2008 |
| JP | 2008-272767 A | | 11/2008 |
| JP | 2010-51988 A | | 3/2010 |
| JP | 2013-154366 A | | 8/2013 |

* cited by examiner

WELDED PORTION INSPECTION METHOD

BACKGROUND

Technical Field

The present invention relates to a welded portion inspection method for inspecting a welded portion, and particularly to an inspection method for inspecting a welded state of a welded portion formed when a plurality of workpieces are welded together using laser light.

Background Art

Conventionally, when two steel plates are overlapped and laser-welded, for example, a welded portion formed by the laser welding is subjected to quality evaluation. As an example of a method for evaluating the quality of the welded portion formed by laser welding (welded portion inspection method), Patent Document 1 discloses a method of inspecting the welded portion using reflected light of laser light.

In this example, a laser torch irradiates the workpieces with a YAG laser, for example, and laser reflected light is received by a first light-receiving/output means from diagonally above and forwardly of the direction in which the welding proceeds. A second light-receiving/output means receives welding light including vapor light emission (plume) or laser reflected light in a coaxial direction with respect to the direction of laser light irradiation. The laser reflected light and the welding light simultaneously received from the predetermined two directions are converted into electric signals corresponding to respective intensities, and the weld quality is determined based on the intensity of the electric signals or its change.

RELATED ART DOCUMENT

Patent Document

Patent Document 1: JP 2008-87056 A

SUMMARY

In the welded portion inspection method according to Patent Document 1, the welded portion is inspected by utilizing the return light (light emitted from the workpieces), such as the reflected light of the laser light during welding, that returns to the device. The reliability of the inspection of the welded portion may be increased if, after the welding laser light irradiation, inspection is performed by successively irradiating the post-welding molten portion with inspection laser light having a lower output than the welding laser light.

In this case, because the state of the molten portion after welding is readily changed, the time of transition from welding to inspection should desirably be decreased. As the time for welding and inspection is further decreased, it becomes difficult to start reception of light by identifying the emitted light at the time of inspection laser light irradiation in time with the switching of irradiation from welding laser light to inspection laser light. Thus, the light reception would be started before inspection laser light irradiation (i.e., during welding laser irradiation).

However, when such light reception method is adopted, the light emitted from the workpieces at the time of welding laser light irradiation would also be received, and the welded state would be inspected based on the intensity waveform including the light emitted from the workpieces. As a result, accurate inspection of the welded state may be hindered.

The present invention was made in view of the above, and an object of the present invention relates to a welded portion inspection method such that emitted light from the molten portion during inspection laser light irradiation can be identified with high accuracy, enabling inspection with improved reliability.

In order to achieve the object, a welded portion inspection method according to the present invention for inspecting a welded state of a welded portion formed when a plurality of workpieces are welded includes a first irradiation step of irradiating the workpieces with welding laser light along a weld trajectory set on the workpieces for welding the workpieces; a second irradiation step of performing inspection laser light irradiation along a scan trajectory set in a molten portion of the workpieces melted by the welding laser light; a light receiving step of receiving emitted light emitted from the workpieces due to the irradiation of the workpieces with the welding laser light and the inspection laser light during a period from the welding laser light irradiation in the first irradiation step to the end of the second irradiation step; and an inspection step of inspecting the welded state of the welded portion based on an intensity waveform of the received emitted light. During transition from the first irradiation step to the second irradiation step, the welding laser light irradiation is interrupted and then the laser light with which the workpieces is irradiated is switched to the inspection laser light; and in the inspection step, two points in time are extracted from the intensity waveform of the emitted light at which the emitted light intensity is equal to or less than a certain threshold value as an inspection start point in time and an inspection end point in time, a period from the inspection start point in time to the inspection end point in time is estimated as being an irradiation period of the inspection laser light irradiation, and the welded state is inspected based on the intensity waveform of the emitted light in the irradiation period.

According to the present invention, in the first irradiation step, the welding laser light irradiation is performed along the weld trajectory set on the workpieces, whereby the molten portion (a so-called molten pool) is produced along the weld trajectory. When transitioning from the first irradiation step to the second irradiation step, the irradiation with the welding laser light is interrupted and then the welding laser light is switched to the inspection laser light, and the inspection laser light irradiation is performed along the scan trajectory set on the molten portion in the second irradiation step.

In the series of steps including the first irradiation step and the second irradiation step, emitted light from the workpieces is received from the time of irradiation with the welding laser light in the first irradiation step to the end of the second irradiation step. The "time of irradiation with the welding laser light in the first irradiation step" herein refers the start point in time of the first irradiation step or a point in time in the course of the step, and is at least a point in time in the first irradiation step which is assumed to be prior to the start of the second irradiation step.

Thus, the emitted light from the workpieces is received prior to the start of the second irradiation step, whereby the intensity waveform of the emitted light including the start point in time of the second irradiation step can be obtained. Further, because the emitted light reception start timing need not coincide with the second irradiation step start timing, the first irradiation step can be swiftly transitioned to the second irradiation step.

Based on the intensity waveform of the emitted light received as described above, the welded state of the welded portion is inspected. According to the present invention, in the inspection step, the two points in time at which the emitted light intensity is equal to or less than a certain threshold value are extracted from the intensity waveform of the emitted light as the inspection start point in time and the inspection end point in time. The period between the inspection start point in time and the inspection end point in time is estimated as being the inspection laser light irradiation period, and the welded state is inspected based on the intensity waveform of the emitted light in the irradiation period.

In the present invention, the welding laser light irradiation is interrupted before the switching from the welding laser light to the inspection laser light (in other words, at the point in time of transition from the first irradiation step to the second irradiation step). As a result, the intensity of the emitted light from the workpieces decreases. The emitted light intensity also decreases after the end of the inspection laser light irradiation. In order to utilize the decrease in the emitted light, the threshold value corresponding to the two points in time at which the emitted light intensity is decreased is provided, so that the inspection start point in time and the inspection end point in time by the inspection laser light can be accurately identified. Thus, the period of inspection laser light irradiation can be accurately identified, and the welded portion can be inspected with high reliability by using the intensity waveform of the emitted light in the irradiation period.

The "emitted light emitted from the workpieces due to the irradiation with the workpieces" refers to the light (return light) including at least one of reflected light from the molten portion due to the welding laser light and the inspection laser light, vapor light emission caused by the melting and vaporization of the workpieces, and thermal radiation light radiated from the molten portion of the workpieces. A weld inspection method based on the intensity waveform of the emitted light will be described in detail later with reference to an embodiment.

As described above, normally, when transitioning from the first irradiation step to the second irradiation step, if the intensity of the emitted light from the workpieces is decreased by the interruption of the welding laser light irradiation, the light receiving step may be performed continuously from the start of the first irradiation step to the end of the second irradiation step, or it may be started from somewhere in the first irradiation step.

However, an experiment conducted by the inventors has revealed that when the workpiece material has higher heat conductivity than general metal material, or when irradiation with high output welding laser light is required as a welding condition, the molten portion may keep generating heat even when the first irradiation step transitions to the second irradiation step. As a result, when transitioning from the first irradiation step to the second irradiation step, the intensity of the emitted light from the workpieces may not be decreased even if the welding laser light irradiation is interrupted.

Thus, in a preferred aspect of the present invention, in the light receiving step, when transitioning from the first irradiation step to the second irradiation step, the welding laser light irradiation is interrupted, and then the light in an area outside the molten portion of the workpieces is received. According to this aspect, in the light receiving step, the light from an area outside the molten portion of the workpiece is received at the point in time of transition from the first irradiation step to the second irradiation step, whereby the emitted light intensity can be decreased to the above-described threshold value at this point in time. As a result, the start point in time of the inspection laser light irradiation period can be more accurately identified.

When the workpieces are welded, the first irradiation step and the second irradiation step may be repeated, and the light receiving step and the inspection step may be performed for each of the first and second irradiation steps. Further, in the first irradiation step after transition from the second irradiation step, the welding laser light may be caused to irradiate along the weld trajectory set in the molten portion or in the vicinity of the molten portion. In this case, however, a sufficient decrease may not be obtained in the emitted light at the end of the preceding second irradiation step.

Thus, according to a preferred aspect for such a case, in the light receiving step, light in an area outside the molten portion of the workpieces is received when transitioning from the second irradiation step to the first irradiation step. According to this aspect, in the light receiving step, the light from an area outside the molten portion of the workpieces is received at the point in time of transition from the second irradiation step to the first irradiation step, whereby the emitted light intensity at this point in time can be decreased to the above-described threshold value. As a result, the end point in time of the inspection laser light irradiation period can be more accurately identified.

According to the present invention, the emitted light from the molten portion during inspection laser light irradiation is highly accurately identified, whereby inspection can be performed with improved reliability.

BRIEF DESCRIPTION OF DRAWINGS

FIG. 3A illustrates the state of the laser light and emitted light in a first irradiation step. FIG. 3B illustrates the state of the laser light and emitted light at the time of switching from the first irradiation step to the second irradiation step. FIG. 3C illustrates a second irradiation step.

FIG. 6A illustrates the state of the laser light and emitted light in the first irradiation step. FIG. 6B illustrates the state of the laser light and emitted light at the time of switching from the first irradiation step to the second irradiation step. FIG. 6C illustrates the second irradiation step.

FIG. 9A illustrates the state of the laser light and emitted light in the first irradiation step. FIG. 9B illustrates the state of the laser light and emitted light at the time of switching from the first irradiation step to the second irradiation step. FIG. 9C illustrates the second irradiation step. FIG. 9D illustrates the state of the laser light and emitted light at the time of switching from the second irradiation step to the first irradiation step. FIG. 9E illustrates the first irradiation step.

DETAILED DESCRIPTION OF THE EMBODIMENTS

A welded portion inspection method according to embodiments of the present invention will be described in the following.

1. Device Configuration

Figure 1:
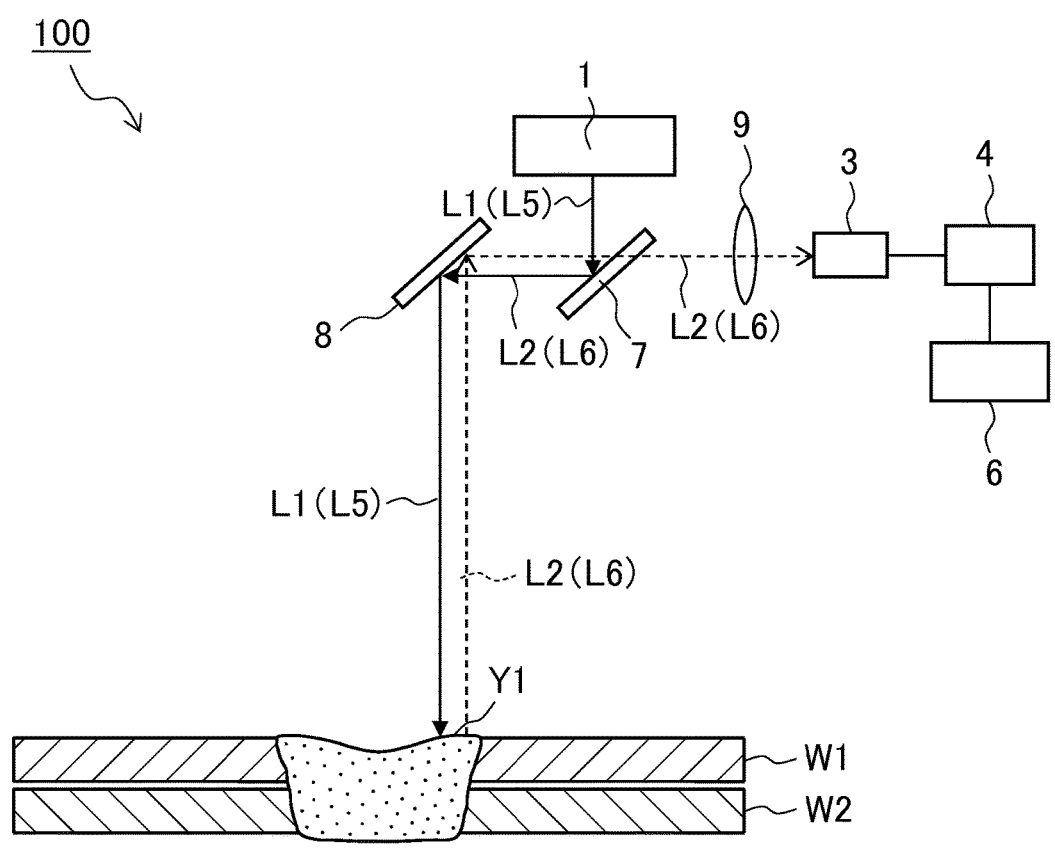
FIG. 1 schematically illustrates the overall configuration of an inspection device for implementing a welded portion inspection method according to an embodiment of the present invention.

FIG. 1 schematically illustrates the overall configuration of an inspection device for implementing a welded portion inspection method according to an embodiment of the present invention.

An inspection device 100 illustrated in FIG. 1 mainly includes a laser light irradiation unit 1, a conversion unit 3, an amplifier 4, and an inspection unit 6. In the following, each element will be described, and the inspection method will also be described.

The laser light irradiation unit 1 is a device that selectively outputs welding laser light L1 or inspection laser light L5 with lower output than the welding laser light L1, and that causes the selected laser light to irradiate two workpieces (such as steel plates) W1 and W2 which are overlapped or disposed slightly spaced apart from each other.

Specifically, of the welding laser light L1 and the inspection laser light L5, the selected laser light is successively reflected by a fixed mirror 7 and a drive mirror 8 in an optical system before irradiating the two workpieces W1 and W2. The drive mirror 8 is drivingly controlled to control the direction of reflection of the welding laser light L1 (or the inspection laser light L5) incident on the drive mirror 8 so that the welding laser light L1 (or the inspection laser light L5) can irradiate the workpieces at a desired position.

The drive mirror 8 and the fixed mirror 7 are configured such that emitted light L2 (L6) emitted from the workpieces due to the irradiation of the workpieces with the welding laser light L1 (or the inspection laser light L5), namely the return light returning to the inspection device from the workpieces, is reflected by the drive mirror 8 and then passed through the fixed mirror 7. The emitted light L2 (L6) that has passed through the fixed mirror 7 is input to the conversion unit 3.

The emitted light L2 (L6) is the light that includes at least one of the reflected light from the molten portion due to the welding laser light L1 or the inspection laser light L5, vapor light emission produced by the melting and vaporization of the workpieces, and thermal radiation light emitted from the molten portion of the workpieces. In the present embodiment, the emitted light emitted from the workpieces due to the welding laser light L1 irradiation is indicated by the sign L2, while the emitted light emitted from the workpieces due to the inspection laser light L5 irradiation is indicated by the sign L6.

The conversion unit 3 includes a sensor, such as a photosensor, that converts the emitted light L2 (L6) that has passed through the fixed mirror 7 into an electric signal. The electric signal is output to the amplifier 4. The amplifier 4 is a device for amplifying the signal intensity of the electric signal output from the conversion unit 3. The electric signal amplified by the amplifier 4 is transmitted to the inspection unit 6.

The inspection unit 6 processes the electric signal transmitted from the amplifier 4 to inspect the welded state of the welded portion formed on the workpieces W1 and W2. Specifically, the inspection unit 6 extracts, from the waveform of the obtained emitted lights L2 and L6, the emitted light L6 received during the inspection laser light L5 irradiation by estimation, as will be described below. Based on the waveform of the received emitted light L6 that has been extracted, the inspection unit 6 inspects the welded state of the welded portion. A specific method for extracting the return waveform in the inspection unit 6 will be described later with reference to the description of an inspection method.

When the welding and the inspection are performed separately, it is desirable to shorten the time for welding, the time for transition from welding to inspection, and the time for inspection. Thus, in the present embodiment, the conversion unit 3 is configured to receive all of the emitted lights L2 and L6 during the welding laser light L1 and inspection laser light L5 irradiation, and then to extract the emitted light L6 received during the inspection laser light L5 irradiation by estimation.

For example, with respect to the extracted emitted light L6, the welded state of the welded portion formed on the workpieces W1 and W2 is inspected based on the periodicity in the intensity change (temporal intensity change) of the emitted light. Specifically, when the welded state of the welded portion is normal, the intensity change of the extracted emitted light L6 will become relatively small, while the intensity change will become relatively large when the welded state of the welded portion is defective.

Thus, by detecting the periodicity in the intensity change of the emitted light L6 using the inspection unit 6, it can be inspected whether a defective weld portion is formed even when the electric signal obtained from the emitted light L2 is weak, or when the intensity of the emitted light L2 varies depending on a temperature change in the workpieces, for example.

In another inspection method, the inspection unit 6 may inspect the welded state at the welded portion based on the average intensity of the received emitted light L2. For example, when the welded state of the welded portion is defective (such as when a part of the workpieces W1 and W2 is missing), increase in the workpiece temperature is suppressed, whereby the intensity of the emitted light L2 decreases compared with the intensity of the emitted light in the case where the welded state of the welded portion is normal. Thus, through a comparison with the emitted light intensity in a normal case, the welded portion can be inspected for a defective weld portion.

2. Welded Portion Inspection Method

In the following, the welded portion inspection method according to first to third embodiments using the welded portion inspection device 100 will be described.

First Embodiment

Figure 2:
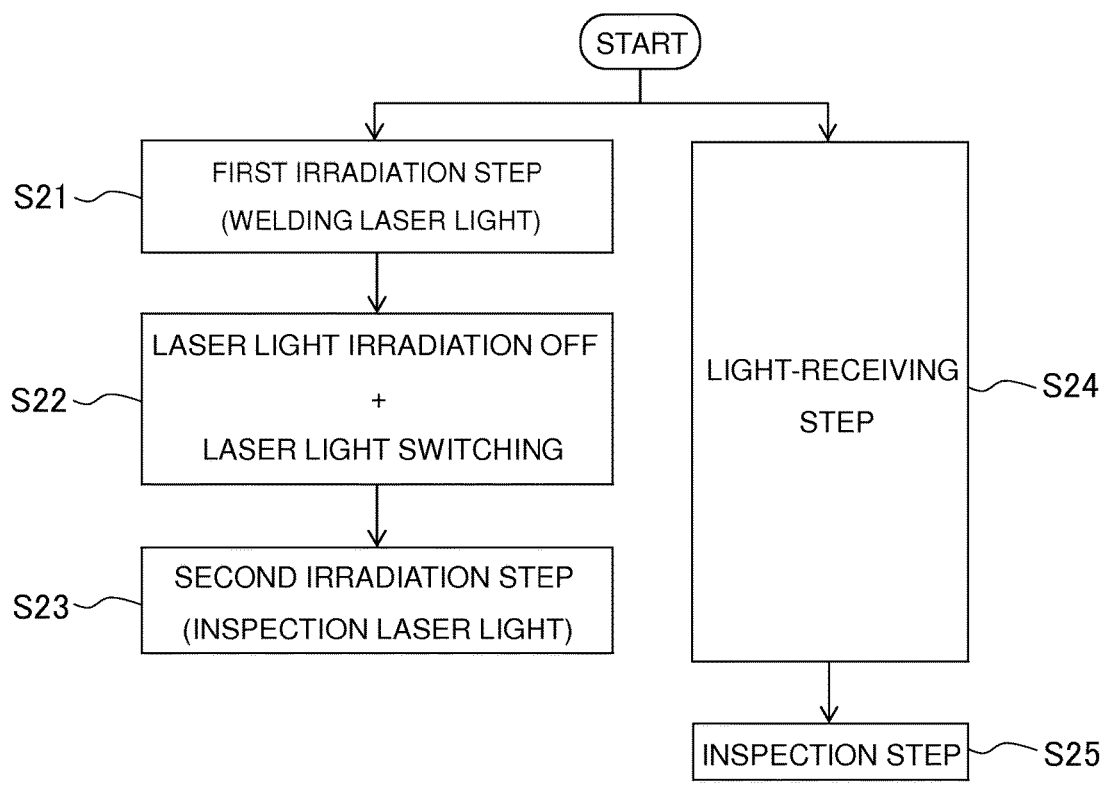
FIG. 2 is a flow chart for describing the inspection method according to the first embodiment.
Figure 3A:
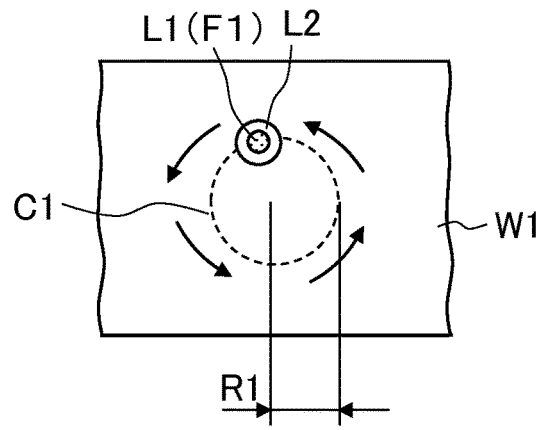
FIGS. 3A-3C illustrate the state of laser light and emitted light on the workpiece surface according to the inspection method of FIG. 2.
Figure 3B:
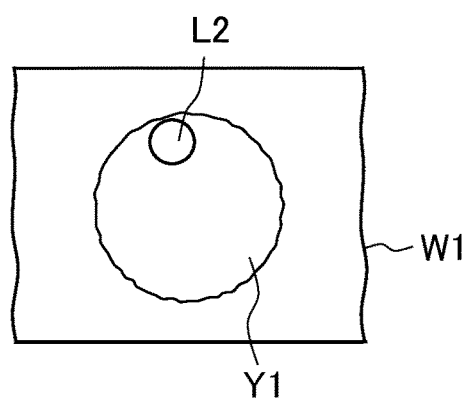
Figure 3C:
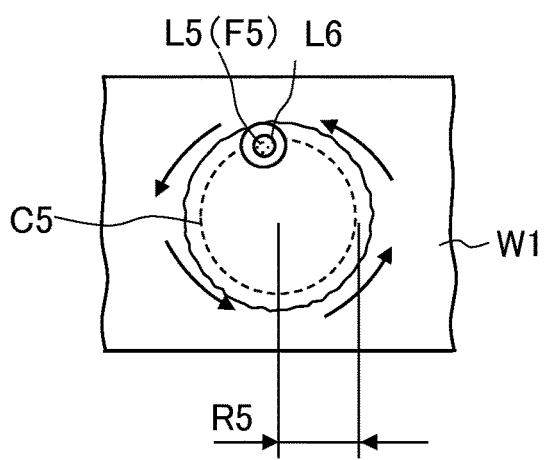
Figure 4:
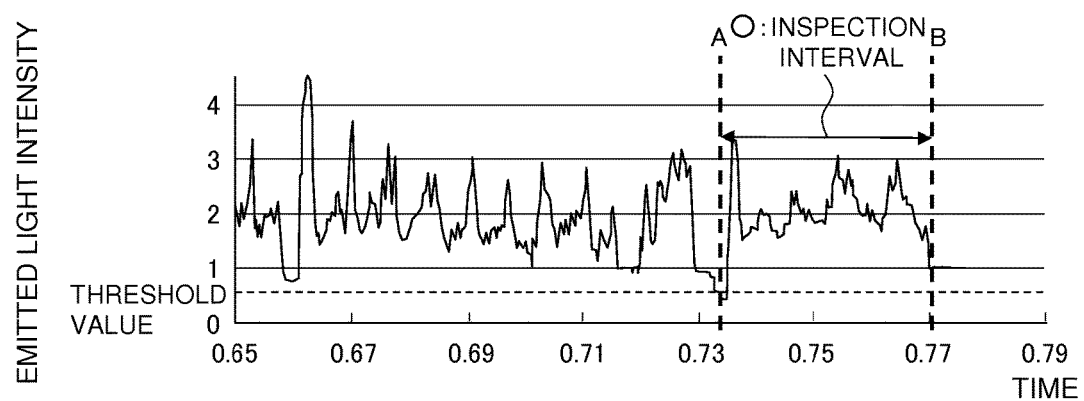
FIG. 4 illustrates an example of the intensity waveform of the emitted light received in the light receiving step of FIG. 2.

FIG. 2 is a flow chart for describing the inspection method according to the first embodiment. FIGS. 3A-3C illustrate the state of laser light and emitted light on the workpiece surface according to the inspection method of FIG. 2. FIG. 3A illustrates the state of the laser light and emitted light in a first irradiation step. FIG. 3B illustrates the state of the laser light and emitted light at the time of switching from the first irradiation step to the second irradiation step. FIG. 3C illustrates a second irradiation step. FIG. 4 illustrates an example of the waveform of the intensity of the emitted light received in the light receiving step of FIG. 2.

2-1. First Irradiation Step

First, as illustrated, the first irradiation step S21 is performed. Specifically, in the first irradiation step S21, the welding laser light L1 is selected in the laser light irradiation unit 1, and the welding laser light L1 (such as a YAG laser having a predetermined laser light wavelength) is caused to irradiate the two workpieces (such as steel plates) W1 and W2 which are overlapped or slightly spaced apart from each other. Thus, the two workpieces W1 and W2 are welded (weld bonding).

More specifically, the welding laser light L1 generated by the laser light irradiation unit 1 is successively reflected by the fixed mirror 7 and the drive mirror 8 of the optical system, and then caused to irradiate the two workpieces W1 and W2. The drive mirror 8 is driven to control the reflected direction of the welding laser light L1 so that a focal point F1 of the welding laser light L1 is rotated along a substantially circular weld trajectory C1 having a radius set on the workpiece W1, as illustrated in FIG. 3A. Thus, the welding laser light L1 is caused to irradiate along the weld trajectory C1. The focal point F1 may be rotated a plurality of times.

As a result of the welding laser light L1 irradiation by the laser light irradiation unit 1 along the weld trajectory C1, the workpieces W1 and W2 are melted, forming a ring-shaped molten portion (molten pool) Y1 to the left and right and behind the welding laser light L1 with respect to the direction of movement of the welding laser light L1 (see FIG. 1 and FIG. 3B). Specifically, as the welding laser light L1 is caused to irradiate along the weld trajectory C1, the circular molten portion Y1 is formed. The molten portion Y1 is then cooled, forming a welded portion and joining the two workpieces W1 and W2 (weld bonding).

According to the present embodiment, the welding is performed along the weld trajectory C1. However, the drive mirror 8 may be driven to move the focal point F1 of the welding laser light L1 inward of the weld trajectory C1, so that the focal point F1 of the welding laser light L1 can be caused to irradiate along a substantially circular weld trajectory having a smaller radius R1 of the weld trajectory C1 and concentric with the weld trajectory C1.

2-2. Laser Light Switching Step

Thereafter, a laser light switching step S22 of FIG. 2 is performed. In the switching step S22, before the inspection laser light L5 is caused to irradiate the molten portion (during transition from the first irradiation step S21 to the second irradiation step S23), the welding laser light L1 is switched to the inspection laser light L5. Specifically, the welding laser light L1 irradiation is interrupted, and then the welding laser light L1 irradiation is switched to the inspection laser light L5 irradiation. The inspection laser light L5 has a smaller output than the welding laser light L1.

Thus, the welding laser light L1 irradiation is interrupted (see FIG. 3B), so that the intensity of the received emitted light can be decreased in the light receiving step which will be described below. By detecting the intensity of the received light, the inspection start point in time for the second irradiation step can be extracted. As illustrated in FIG. 3C, the focal point F1 of the welding laser light L1 is rotated along the substantially circular weld trajectory C1 having the radius set on the workpiece W1, and the welding laser light L1 irradiation is performed on the weld trajectory C1. The focal point F1 may be rotated a plurality of times.

2-3. Second Irradiation Step

Then, a second irradiation step S23 of FIG. 2 is performed. In the second irradiation step S23, the inspection laser light L5 is caused by the laser light irradiation unit 1 to irradiate the molten portion formed after the welding laser light L1 irradiation by the laser light irradiation unit 1 along the weld trajectory C1.

Specifically, as illustrated in FIG. 3C, after the welding laser light L1 irradiation along the weld trajectory C1 by the laser light irradiation unit 1, the inspection laser light L5 is caused to irradiate along a scan trajectory C5 set in the molten portion Y of the workpiece W1. The inspection laser light L5 is successively reflected by the fixed mirror 7 and the drive mirror 8 of the optical system, and then caused to irradiate the two workpieces W1 and W2 as illustrated in FIG. 1, as in the case of the welding laser light L1.

More specifically, as in the first irradiation step S21, the drive mirror 8 is driven to adjust the reflected direction of the inspection laser light L5 so that, as illustrated in FIGS. 3A-3C, a focal point F5 of the inspection laser light L5 is rotated at a substantially constant speed along the substantially circular scan trajectory C5 set inside the outer edge of the molten portion Y1 and having a radius R5. The inspection laser light L5 irradiation is performed on the scan trajectory C5. After the inspection laser light L5 irradiation, the irradiation with the inspection laser light L5 is interrupted. The center of the weld trajectory C1 and that of the scan trajectory C5 are aligned, whereby the inside of a concentric circle of the weld trajectory C1 can be scanned with the inspection laser light L5.

2-4. Light Receiving Step

As illustrated in FIG. 2, in a light receiving step S24, during the period from the welding laser light L1 irradiation in the first irradiation step S21 to the end of the second irradiation step S23, emitted light emitted from the workpiece W1 by the irradiation with the welding laser light L1 and the inspection laser light L5 is received by the conversion unit 3 as return light (emitted light L2 and L6) returning to the inspection device 100, and the intensity of the return light is detected. In the present embodiment, the emitted light L2 is received from the start point in time of the first irradiation step S21.

Specifically, during the welding laser light L1 irradiation, reflected light is produced from the molten portion due to the welding laser light L1, vapor light emission (plasma light) is produced by the melting and vaporization of the workpieces W1 and W2, and thermal radiation light (infrared light) is emitted from the molten portion of the workpieces. Light including at least one of those lights is detected as the emitted light L2. During detection, because these emitted lights have different wavelengths, a specific light required for welded portion inspection may be extracted by a filter and the like.

Similarly, during the inspection laser light L5 irradiation, reflected light is produced from the molten portion due to the inspection laser light L5, vapor light emission is caused by the melting and vaporization of the workpieces W1 and W2, and thermal radiation light is emitted from the molten portion of the workpiece, and light including at least one of those lights is detected as the emitted light L6. As a result, an emitted light waveform shown in FIG. 4 is obtained.

Thus, in the light receiving step S24, the emitted light is received before the start of the second irradiation step S23, so that the intensity waveform of the emitted light including the start point in time of the second irradiation step can be obtained. Further, there is no need to align the emitted light reception start timing with the start timing of the second irradiation step (i.e., there is no need for timing synchronization). Accordingly, the first irradiation step S21 can swiftly transition to the second irradiation step S23.

2-5. Inspection Step

An inspection step S25 of FIG. 2 is performed. In the inspection step S25, based on the intensity waveform of the emitted light obtained in the light receiving step S24, the welded state of the welded portion is inspected. Specifically, as illustrated in FIG. 4, two points in time of the intensity waveform of the emitted light at which the emitted light intensity is not more than a certain threshold value are extracted as an inspection start point in time A and an inspection end point in time B.

Then, the period between the inspection start point in time A and the inspection end point in time B is estimated as being the inspection laser light irradiation period (i.e., an inspection interval), and the welded state is inspected based on the intensity waveform of the emitted light in the irradiation period. The welded state inspection method has already been described with reference to the inspection unit 6. Thus, the description of the method will be omitted.

As described above, when the welding laser light L1 is switched to the inspection laser light L5 (in other words, at the point in time of transition from the first irradiation step to the second irradiation step), the welding laser light L1 irradiation is interrupted, resulting in a decrease in the emitted light intensity, as illustrated in FIG. 4. The emitted light intensity is also decreased after the end of the irradiation with the inspection laser light L5.

By providing the threshold value corresponding to the two points in time at which the emitted light intensity is decreased, the inspection start point in time A and the inspection end point in time B by the inspection laser light L5 can be accurately identified. Thus, the irradiation period of the inspection laser light L5 (inspection interval) can be accurately identified, and by using the intensity waveform of the emitted light in the irradiation period, the welded portion can be inspected with high reliability.

When the material of the workpieces W1 and W2 has a higher heat conductivity than a general metal material, or when irradiation with high-output welding laser light L1 is required as a welding condition, the emitted light intensity may not be decreased even when the welding laser light irradiation is interrupted when transitioning from the first irradiation step S21 to the second irradiation step S23. As a result, as will be described later with reference to FIG. 7A, the molten portion may keep generating heat, preventing a decrease in the emitted light intensity. This may prevent the extraction of an accurate inspection start point in time. This problem is addressed by a second embodiment of the present invention as will be described below.

Second Embodiment

Figure 5:
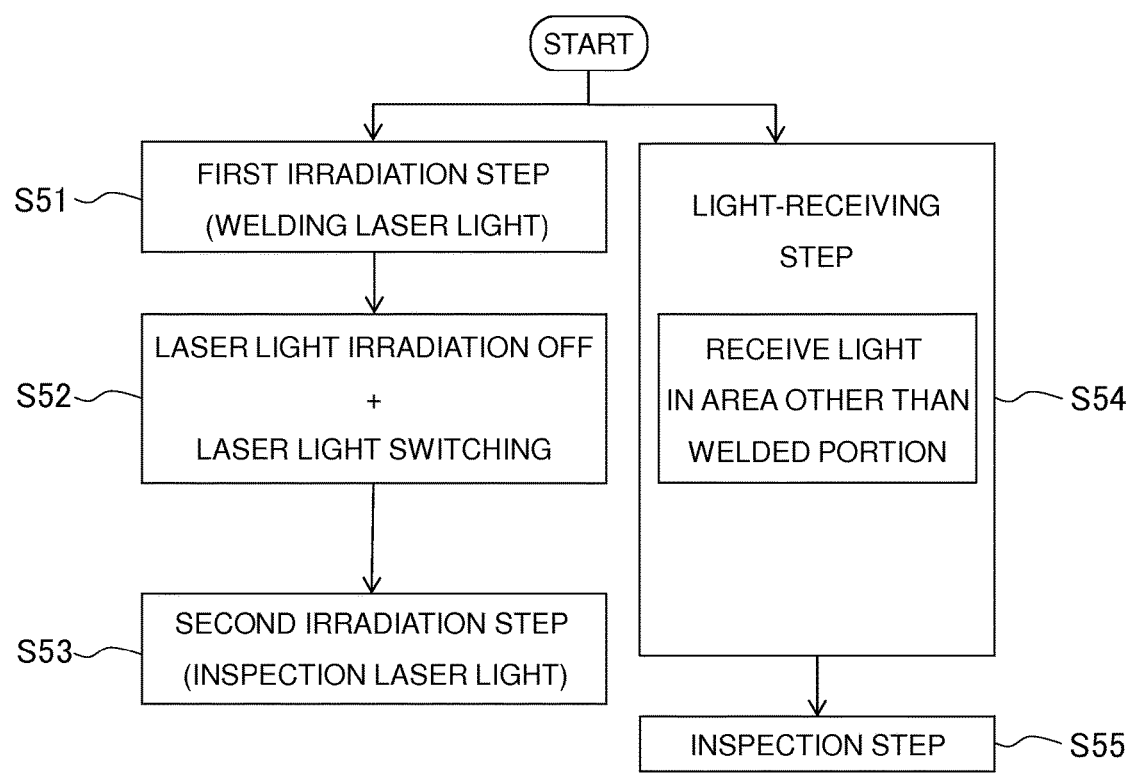
FIG. 5 is a flow chart for describing the inspection method according to a second embodiment of the present invention.
Figure 6A:
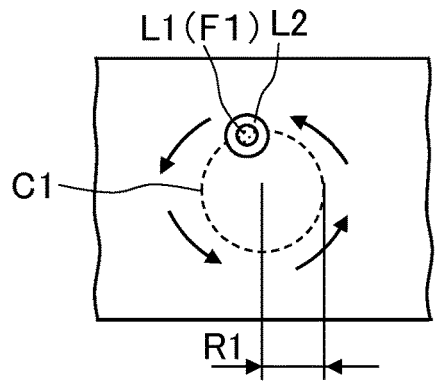
FIGS. 6A-6C illustrate the state of the laser light and emitted light on the workpiece surface according to the inspection method of FIG. 5.
Figure 6B:
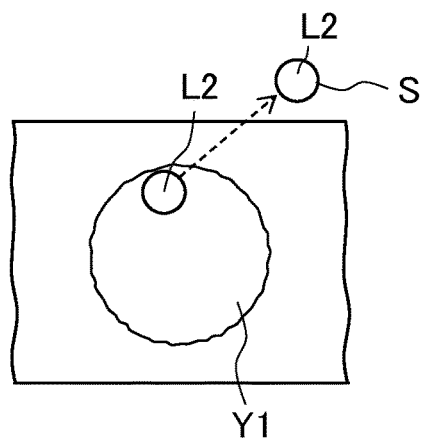
Figure 6C:
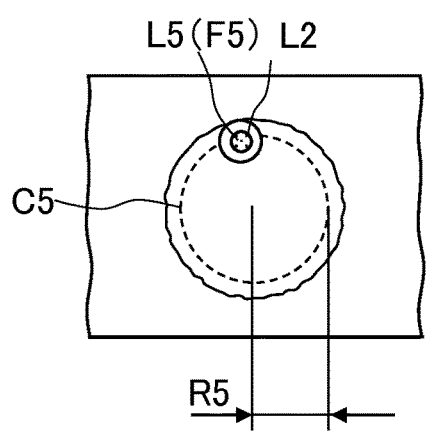
Figure 7A:
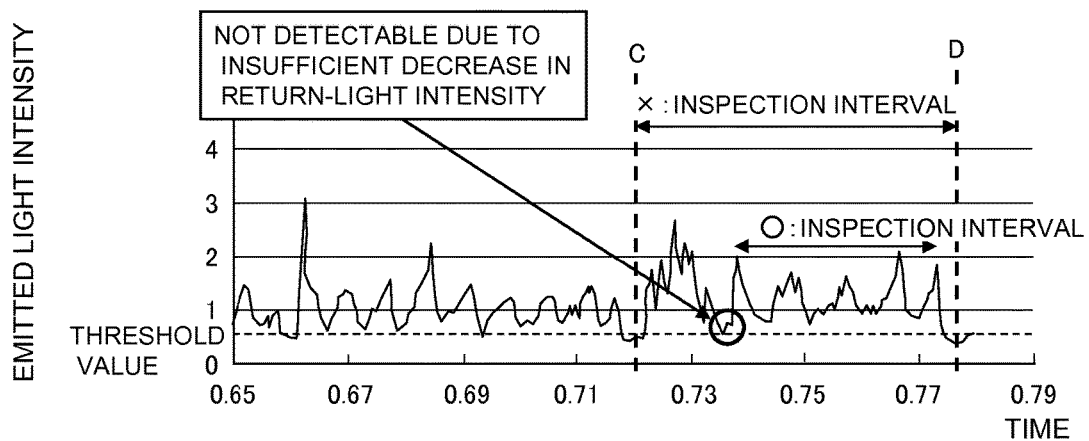
FIG. 7A illustrates an example of the intensity waveform of the emitted light received in the light receiving step according to the first embodiment.
Figure 7B:
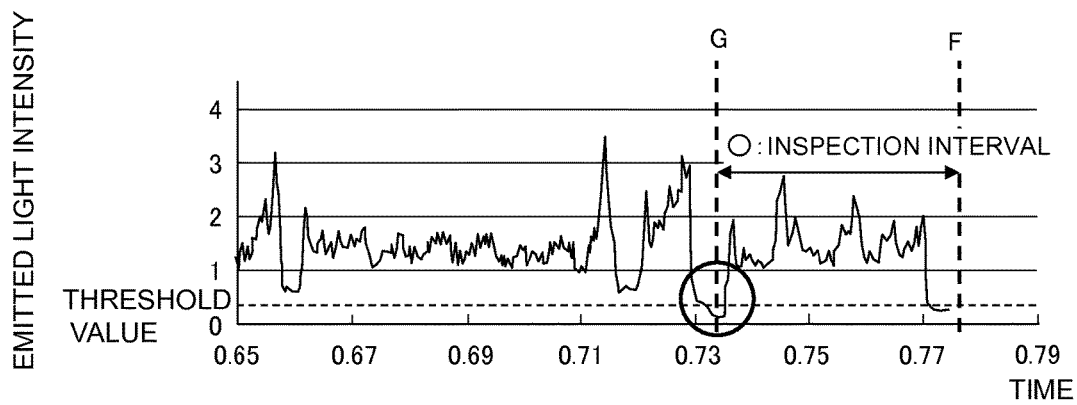
FIG. 7B illustrates an example of the intensity waveform of the emitted light received in the light receiving step according to the second embodiment.

FIG. 5 is a flow chart for describing the inspection method according to the second embodiment. FIGS. 6A-6C the state of the laser light and emitted light on the workpiece surface according to the inspection method illustrated in FIG. 5. FIG. 6A illustrates the state of the laser light and emitted light in the first irradiation step. FIG. 6B illustrates the state of the laser light and emitted light upon switching from the first irradiation step to the second irradiation step. FIG. 6C illustrates the second irradiation step. FIG. 7A illustrates an example of the intensity waveform of the emitted light received in the light receiving step according to the first embodiment. FIG. 7B illustrates an example of the intensity waveform of the emitted light received in the light receiving step according to the second embodiment.

The second embodiment differs from the first embodiment in the light receiving step. Thus, in the following, only the difference will be described, and detailed description of the other points will be omitted.

According to the present embodiment, in the light receiving step S54, during transition from the first irradiation step S51 to the second irradiation step S53 after the welding laser light L1 irradiation is interrupted (see S52 in FIG. 5), light in an area outside the molten portion of the workpiece is received, and then the welding laser light L1 is switched to the inspection laser light L5.

As illustrated in FIG. 6A, after the irradiation with the welding laser light L1 along the weld trajectory C1 is performed as in the first embodiment (see S51 of FIG. 5), the welding laser light L1 irradiation by the laser light irradiation unit 1 is interrupted. Thereafter, in a feature of the present embodiment, the drive mirror 8 is controlled to receive the light from an area S outside the molten portion of the workpiece (such as an area outside the workpiece), as illustrated in FIG. 6B. Then, as in the first embodiment, the welding laser light L1 irradiation is switched to the inspection laser light L5 irradiation (see S52 of FIG. 5), and the second irradiation step and the inspection step are performed as in the first embodiment, as illustrated in FIG. 6C (see S53 and S55 of FIG. 5).

Thus, in the light receiving step S54, the light from the area S outside the molten portion of the workpiece is received at the point in time of transition from the first irradiation step S51 to the second irradiation step S53. Accordingly, as illustrated in FIG. 7B, the intensity of the emitted light at this point in time can be decreased to the above-described threshold value. As a result, a start point in time G of the irradiation period of the inspection laser light can be more accurately identified.

When the emitted light intensity is not decreased as illustrated in FIG. 7A, the state of the welded portion may be inspected by taking into consideration the emitted light intensity due to welding laser light. In contrast, according to the present embodiment, only the intensity waveform of the emitted light due to the inspection laser light is extracted, whereby the state of the welded portion can be more accurately inspected. Further, by controlling the drive mirror 8, the light in the area outside the molten portion of the workpiece can be received more swiftly.

In order to confirm the effect of the second embodiment, workpieces of hot-dip galvanized steel plate (plate thickness 0.7 mm), SPC590DU (plate thickness 1.8 mm), and SPC440 (plate thickness 1.2 mm) were prepared, and the welded portion inspection method according to the first embodiment and the welded portion inspection method according to the second embodiment were implemented.

In the case of the first embodiment, the start point in time of irradiation with the inspection laser light was erroneously extracted 19 times out of 1000. However, in the case of the present embodiment, the start point in time of irradiation with the inspection laser light was accurately extracted in all of 10,000 times. This is considered to be due to the fact that, because the workpieces have large plate thicknesses, the amount of heat fed by the welding laser light is large, so that the emitted light intensity was not decreased sufficiently by the inspection method according to the first embodiment even when the welding laser light irradiation was interrupted, as illustrated in FIG. 7A.

When, as according to the first and the second embodiments, the first irradiation step is repeated in the molten portion or its vicinity after the second irradiation step S23 is performed (S53) following the first irradiation step S21 (S51), it may become impossible to confirm the end of the inspection laser light in the second irradiation step. The problem is addressed by a third embodiment of the present invention as will be described below. While the third embodiment is based on the second embodiment in the following description, the embodiment may be based on the first embodiment.

Third Embodiment

Figure 8:
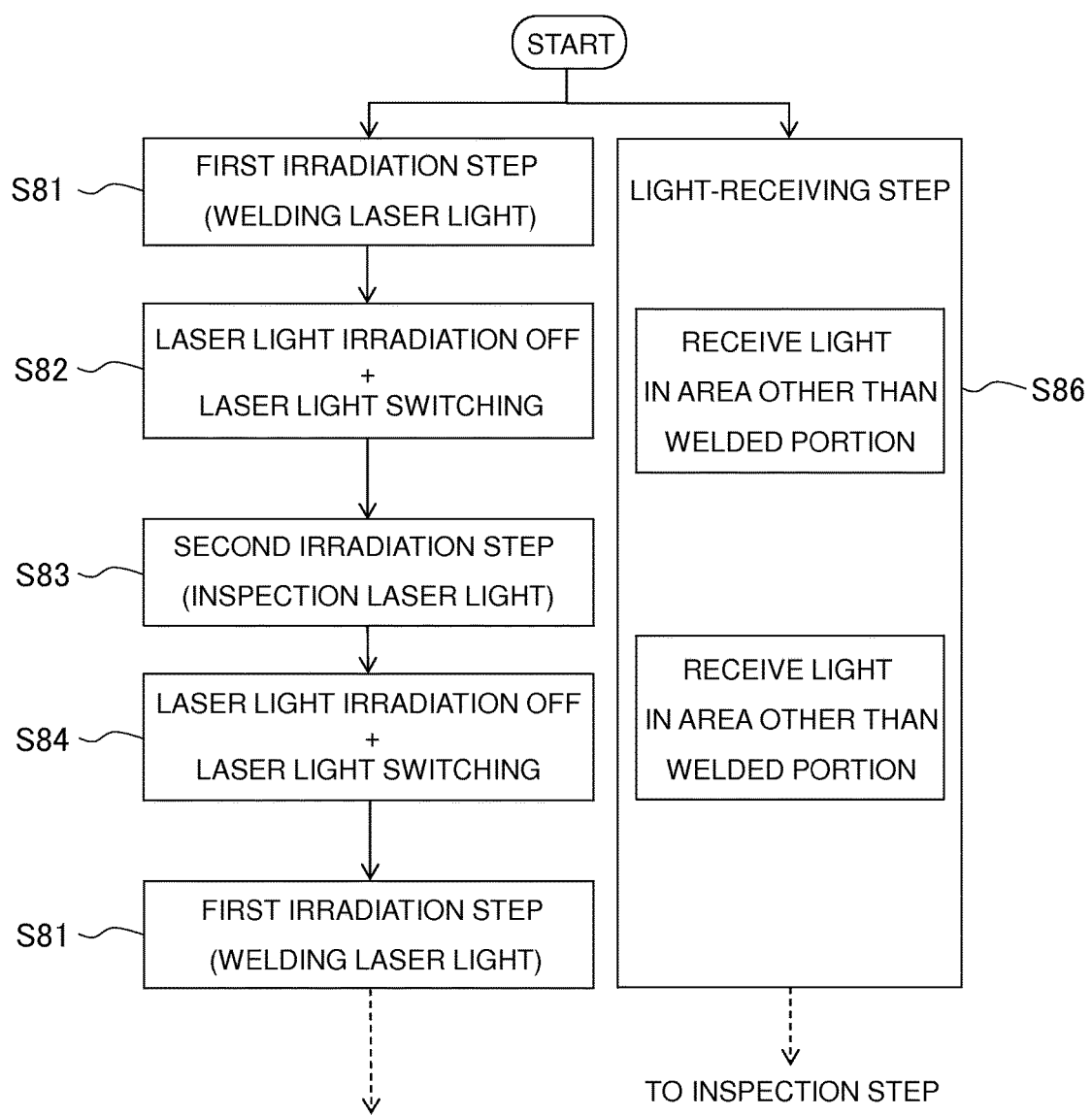
FIG. 8 is a flow chart for describing the inspection method according to a third embodiment.
Figure 9A:
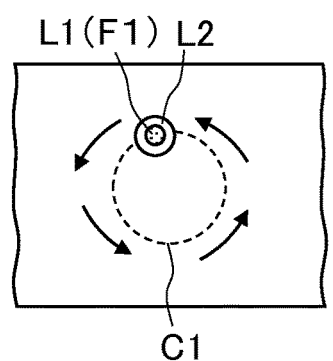
FIGS. 9A-9E illustrate the state of the laser light and emitted light on the workpiece surface according to the inspection method of FIG. 8.
Figure 9B:
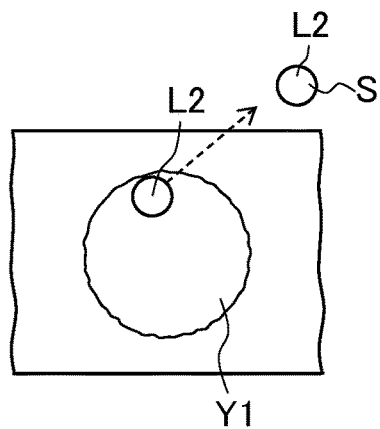
Figure 9C:
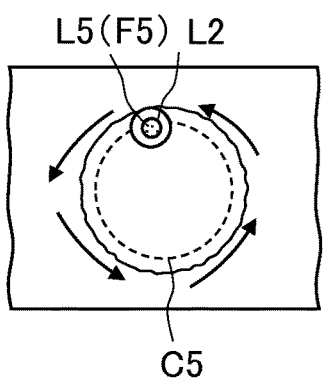
Figure 9D:
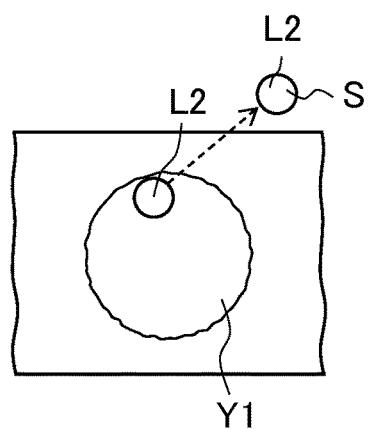
Figure 9E:
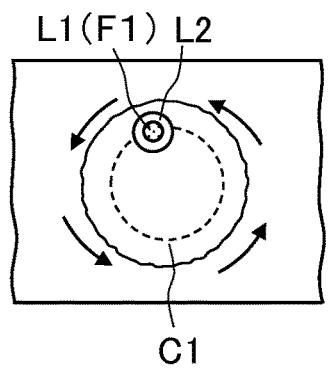

FIG. 8 is a flowchart for describing the inspection method according to the third embodiment. FIGS. 9A-9E illustrate the state of the laser light and emitted light on the workpiece surface according to the inspection method of FIG. 8. FIG. 9A illustrates the state of the laser light and emitted light in the first irradiation step. FIG. 9B illustrates the state of the laser light and emitted light during switching from the first irradiation step to the second irradiation step. FIG. 9C illustrates the second irradiation step. FIG. 9D illustrates the state of the laser light and emitted light during switching from the second irradiation step to the first irradiation step. FIG. 9E illustrates the first irradiation step.

The third embodiment differs from the second embodiment in that the first irradiation step and the second irradiation step are repeated, and in an accompanying light receiving step. Thus, in the following, only the difference will be described, and the description of the other points will be omitted.

As illustrated in FIG. 8, in the present embodiment, when the workpieces are welded, a first irradiation step S81 and a second irradiation step S83 are repeated, and a light receiving step S86 and an inspection step are performed for each of the first and second irradiation steps. In the present embodiment, after the first irradiation step S81 and the second irradiation step S83 are repeated, the inspection step is performed for each of the first and second irradiation steps. However, in the light receiving step, the inspection step may be performed in parallel with the light receiving step each time the emitted light in the first and second irradiation steps is received.

In the present embodiment, as in the second embodiment, after the irradiation with the welding laser light L1 along the weld trajectory C1 in the first irradiation step S81, as illustrated in FIG. 9A (see S81 in FIG. 8), the welding laser light L1 irradiation is interrupted by the laser light irradiation unit 1. Then, as illustrated in FIG. 9B (see S82 of FIG. 8), the drive mirror 8 is controlled to receive light in an area outside the molten portion of the workpiece (an area outside the workpiece) S (see S86 of FIG. 8). Thereafter, as in the first embodiment, the welding laser light L1 irradiation is switched to the inspection laser light L5 irradiation (see S82 of FIG. 8), followed by the second irradiation step as illustrated in FIG. 9C (see S83 of FIG. 8).

When transitioning from the second irradiation step S83 to the first irradiation step S81, the inspection laser light L5 irradiation is interrupted (see S84 of FIG. 8), and then the drive mirror 8 is controlled to receive the light in the area S outside the molten portion of the workpiece, as illustrated in FIG. 9D. In the present embodiment, the light in the area S outside the molten portion of the workpiece is received after the inspection laser light L5 irradiation is interrupted. However, because the inspection laser light L5 does not have laser intensity that melts the workpieces, the inspection laser light L5 irradiation may be interrupted after the light in the area outside the molten portion of the workpiece is received, and then the inspection laser light L5 may be switched to the welding laser light L1.

Thereafter, in the first irradiation step S81 after transition from the second irradiation step S83, the welding laser light L1 is caused to irradiate along the weld trajectory C1 set in the molten portion Y1 or the vicinity of the molten portion Y1, and the series of steps S81 to S84 is repeated.

In this way, in the light receiving step S86, the light from the area outside the molten portion of the workpiece Y1 is received at the point in time of transition from the second irradiation step S83 to the first irradiation step S81, whereby the emitted light intensity can be decreased to the above-described threshold value at this point in time. Accordingly, the end point in time of the inspection laser light irradiation period can be more accurately identified.

While the embodiment of the present invention has been described in detail, the present invention is not limited to the embodiment, and various design modifications may be made within the scope and spirit of the present invention set forth in the claims.

DESCRIPTION OF SYMBOLS

1 Laser light irradiation unit
3 Conversion unit
4 Amplifier
6 Inspection unit
7 Fixed mirror
8 Drive mirror
9 Condensing lens
100 Inspection device
C0 Center of welding
C1 Weld trajectory
C5 Scan trajectory
F1 Focal point of welding laser light
F5 Focal point of inspection laser light
L1 Welding laser light
L2 Emitted light
L5 Inspection laser light
L6 Emitted light
W1, W2 Workpiece
Y1 Molten portion

What is claimed is:

1. A welded portion inspection method for inspecting a welded state of a welded portion formed when a plurality of workpieces are welded, the method comprising:
   a first irradiation step of irradiating the workpieces with a welding laser light along a weld trajectory set on the workpieces for welding the workpieces;
   a second irradiation step of irradiating the workpieces with an inspection laser light along a scan trajectory set in a molten portion of the workpieces melted by the welding laser light;
   a light receiving step of receiving, by a conversion unit, an emitted light emitted from the workpieces due to the irradiation of the workpieces with the welding laser light and the inspection laser light during a period from the welding laser light irradiation in the first irradiation step to the end of the second irradiation step; and
   an inspection step of inspecting the welded state of the welded portion based on an intensity waveform of the received emitted light, wherein:
during transition from the first irradiation step to the second irradiation step, the welding laser light irradiation is interrupted and then any laser light with which the workpieces is irradiated is switched to the inspection laser light; and in the inspection step, two points in time at which the emitted light intensity is equal to or less than a certain threshold value are extracted from the intensity waveform of the emitted light as an inspection start point in time and an inspection end point in time, a period from the inspection start point in time to the inspection end point in time is estimated as being an irradiation period of the inspection laser light irradiation, and the welded state is inspected based on the intensity waveform of the emitted light in the irradiation period, wherein, in the light receiving step, during transition from the first irradiation step to the second irradiation step, the welding laser light irradiation is interrupted, and then any kind of light in an area outside the molten portion of the workpieces is received by the conversion unit, thereby decreasing the emitted light intensity to the threshold value at the inspection start point in time so as to identify the inspection start point in time.

2. The welded portion inspection method according to claim 1, comprising:
repeating the first irradiation step and the second irradiation step in turn when the workpieces are welded, the light receiving step and the inspection step being performed for each of the first and second irradiation steps;

in the first irradiation step after performing the second irradiation step for the first time, the welding laser light is caused to irradiate along a weld trajectory set in the molten portion or in the vicinity of the molten portion; and in the light receiving step, any kind of light in an area outside the molten portion of the workpieces is received during transition from the second irradiation step to the first irradiation step.

* * * * *